US012059889B2

(12) United States Patent
Dollevoet et al.

(10) Patent No.: US 12,059,889 B2
(45) Date of Patent: Aug. 13, 2024

(54) AIR DRYER UTILIZING LOW TEMPERATURE, HIGH VELOCITY AIR

(71) Applicant: Kimberly-Clark Worldwide, Inc., Neenah, WI (US)

(72) Inventors: Tim G. Dollevoet, Kimberly, WI (US); Jeffrey R. Heller, Fond Du Lac, WI (US); Michael L. Lohoff, Oshkosh, WI (US); Andrew E. Neubauer, Neenah, WI (US); Troy A. Nitke, Freedom, WI (US); Stephen A. Marrano, Oshkosh, WI (US)

(73) Assignee: Kimberly-Clark Inc., Neenah, WI (US)

( * ) Notice: Subject to any disclaimer, the term of this patent is extended or adjusted under 35 U.S.C. 154(b) by 918 days.

(21) Appl. No.: 17/047,139

(22) PCT Filed: Apr. 30, 2018

(86) PCT No.: PCT/US2018/030237
§ 371 (c)(1),
(2) Date: Oct. 13, 2020

(87) PCT Pub. No.: WO2019/212494
PCT Pub. Date: Nov. 7, 2019

(65) Prior Publication Data

US 2021/0146680 A1 May 20, 2021

(51) Int. Cl.
*B41J 11/00* (2006.01)
*B41F 23/04* (2006.01)
(Continued)

(52) U.S. Cl.
CPC ....... *B41J 11/0022* (2021.01); *B41F 23/0426* (2013.01); *F26B 3/04* (2013.01); *F26B 15/18* (2013.01); *F26B 21/004* (2013.01)

(58) Field of Classification Search
CPC ..... B41J 11/0022; B41F 23/0426; F26B 3/04; F26B 15/18; F26B 21/004; F26B 3/02
See application file for complete search history.

(56) References Cited

U.S. PATENT DOCUMENTS 4,848,633 A * 7/1989 Hagen .................. F26B 13/104 34/641
5,242,095 A * 9/1993 Creapo .................. B65H 23/24 34/652
(Continued)

FOREIGN PATENT DOCUMENTS

CN 102328497 A 1/2012
CN 103015249 A 4/2013
(Continued)

OTHER PUBLICATIONS

Henzie, Eric, "How does surface energy impact ink adhesion", Engineered Printing Solution, Aug. 29, 2017, http://www.epsvt.com/blog/2017/08/29/surface-energy-impact-ink-adhesion/.

*Primary Examiner* — David J Laux
(74) *Attorney, Agent, or Firm* — KIMBERLY-CLARK WORLDWIDE, INC.

(57) ABSTRACT

Methods and apparatuses for drying web substrates are described. In one embodiment, a method of drying a web substrate may comprise supplying air to a first dryer head located proximate a web conveyer, the air within the first dryer head having a temperature of less than 176 degrees C., directing air from the first dryer head toward the web conveyer at a velocity greater than 1000 m/min and forming a first drying region, and advancing the web substrate in a first direction on the web conveyer and through the first drying region.

17 Claims, 5 Drawing Sheets

(51) Int. Cl.
*F26B 3/04* (2006.01)
*F26B 15/18* (2006.01)
*F26B 21/00* (2006.01)

(56) References Cited

U.S. PATENT DOCUMENTS

| | | | | |
|---|---|---|---|---|
| 5,278,409 | A | 1/1994 | Bonner | |
| 6,237,248 | B1 * | 5/2001 | Mayer | D21F 5/185 34/456 |
| 6,293,196 | B1 | 9/2001 | DeMoore et al. | |
| 6,372,094 | B1 * | 4/2002 | Heikkila | D21F 5/18 162/201 |
| 6,382,100 | B1 * | 5/2002 | Satoh | B65H 23/24 242/615 |
| 8,673,430 | B2 | 3/2014 | Warner et al. | |
| 9,096,078 | B2 | 8/2015 | Warner et al. | |
| 9,449,798 | B2 | 9/2016 | Nakai et al. | |
| 9,682,540 | B2 | 6/2017 | Chu et al. | |
| 9,840,073 | B2 | 12/2017 | Ihme et al. | |
| 2003/0142188 | A1 | 7/2003 | Jurrens et al. | |
| 2007/0137769 | A1 | 6/2007 | Payne et al. | |
| 2007/0193057 | A1 * | 8/2007 | Girolamo | F26B 13/30 34/114 |
| 2008/0178487 | A1 * | 7/2008 | Komulainen | F26B 13/16 34/117 |
| 2011/0104509 | A1 | 5/2011 | Poulsson et al. | |
| 2013/0108794 | A1 | 5/2013 | Nakamoto et al. | |
| 2015/0147539 | A1 | 5/2015 | Thomas et al. | |
| 2015/0159330 | A1 | 6/2015 | Weisman et al. | |
| 2016/0326692 | A1 | 11/2016 | Gladish et al. | |
| 2017/0225460 | A1 | 8/2017 | Strasemeier et al. | |
| 2017/0261895 | A1 | 9/2017 | Ramackers et al. | |

FOREIGN PATENT DOCUMENTS

| | | | |
|---|---|---|---|
| CN | 107776189 | A | 3/2018 |
| DE | 102015208050 | A1 | 11/2016 |
| EP | 3124279 | B1 | 6/2018 |
| JP | 6198845 | A | 7/1994 |
| JP | H08258243 | A | 10/1996 |
| JP | 2016191550 | A | 11/2016 |
| KR | 20060039409 | A | 5/2006 |
| KR | 100845299 | B1 | 7/2008 |
| WO | 14108596 | A1 | 7/2014 |
| WO | 17134114 | A1 | 8/2017 |

* cited by examiner

AIR DRYER UTILIZING LOW TEMPERATURE, HIGH VELOCITY AIR

TECHNICAL FIELD

The present disclosure relates generally to high speed dryers, and in particular to a highspeed dryer for printed materials which utilizes low temperature, high velocity for drying.

BACKGROUND OF THE DISCLOSURE

Digital printing allows for high-quality words, graphics, and images to be printed on a variety of materials for commercial use. Some examples include printing on film materials for packaging of candy and snack foods or for use as outer cover materials for absorbent articles. The capabilities of digital printheads have increased greatly over the past number of years to allow for high resolution printing at high web speeds. In commercial manufacturing processes, once a web has been printed on, the web is generally rolls up or otherwise process such that the portion of the web that has been printed on is contacted. Before this contact happens, the printed ink must be sufficiently dry so as to not smear. Accordingly, better drying methods and apparatuses for drying the printed ink in a faster, more efficient manner are continually sought.

SUMMARY OF THE DISCLOSURE

The present disclosure relates generally to high speed dryers, and in particular to a highspeed dryer for printed materials which utilizes low temperature, high velocity for drying.

In a first embodiment, a method of drying a web substrate may comprise supplying air to a first dryer head located proximate a web conveyer, the air within the first dryer head having a temperature of less than 176 degrees C., directing air from the first dryer head toward the web conveyer at a velocity greater than 1000 m/min and forming a first drying region, and advancing the web substrate in a first direction on the web conveyer and through the first drying region.

In a second embodiment, the air within the first dryer head of the first embodiment may have a temperature of at least 70 degrees C.

In a third embodiment, the air within the first dryer head of the first embodiment may have a temperature of at least 80 degrees C.

In a fourth embodiment, the air within the first dryer head of any of the first through third embodiments may have a temperature of less than 125 degrees C.

In a fifth embodiment, the method of any of the first through fourth embodiments may further comprise directing air from the first dryer head toward the web conveyer at a velocity greater than 2000 m/min.

In a sixth embodiment, the method of any of the first through fourth embodiments may further comprise directing air from the first dryer head toward the web conveyer at a velocity between about 2000 m/min and about 4000 m/min.

In a seventh embodiment, the first dryer head of any of the first through sixth embodiments may be disposed a distance from the web conveyer between about 8 mm and about 20 mm.

In an eighth embodiment, the first dryer head of any of the first through sixth embodiments may be disposed a distance from the web conveyer between about 10 mm and about 15 mm.

In a ninth embodiment, the air of any of the first through eighth embodiments may be directed from the first dryer head through slits in the dryer head, the slits having a width in the MD of between about 0.5 mm and about 2.0 mm.

In a tenth embodiment, the method of any of the first through ninth embodiments may further comprise supplying air to a second dryer head located proximate the web conveyer and downstream from the first dryer head along a web path of the web substrate, the air within the second dryer head having a temperature that is less than temperature of the air within the first dryer head.

In an eleventh embodiment, the method of any of the first through tenth embodiments may further comprise supplying air to a second dryer head located proximate the web conveyer and downstream from the first dryer head along a web path of the web substrate, the air within the second dryer head having a temperature that is less than 176 degrees C., and directing air from the second dryer head toward the web conveyer at a velocity greater than the air directed at the web conveyer from the first dryer head.

In a twelfth embodiment, the second dyer head of the eleventh embodiment may be disposed longitudinally underneath the first dryer head, and the first web conveyer may be disposed between the first dryer head and the second dryer head.

In a thirteenth embodiment, the method of the twelfth embodiment may further comprise supplying air to a third dryer head located downstream from the first dryer head and the second dryer head along a web path of the web substrate, the air within the third dryer head having a temperature that is less than 176 degrees C., and directing air from the third dryer head toward the web substrate at a velocity greater than the air directed at the web conveyer from the first dryer head, and the third dryer head may be disposed longitudinally underneath the second dryer head.

In a fourteenth embodiment, a drying apparatus for drying web substrates may comprise a web conveying apparatus for conveying a web substrate having a first web surface and an opposing, second web surface, the web conveying apparatus comprising: a first web conveyer comprising a first end configured to receive the web substrate with the first web surface facing away from the first web conveyer and advance the web substrate in a first direction, the first web conveyer further comprising a second end having a first web guide roll configured to advance the web substrate around the first web guide roll to direct the web substrate in a second direction, a second web guide roll disposed proximate the first web conveyer first end, the second web guide roll configured receive the web substrate and to advance the web substrate around the second web guide roll to direct the web substrate in a third direction, the first web surface facing the second web guide roll as the web substrate advances around the second web guide roll, and a second web conveyer configured to receive the web substrate from the second web guide roll and to advance the web substrate in the third direction. The apparatus of the fourteenth embodiment may further comprise a first drying apparatus defining a first drying region along the first web conveyer and configured to dry the first web surface as the web substrate advances in the first direction, and a second drying apparatus defining a second drying region along the second web conveyer and configured to dry the first web surface as the web substrate advances in the third direction.

In a fifteenth embodiment, the second drying apparatus of the fourteenth embodiment may be disposed longitudinally underneath the first drying apparatus.

In a sixteenth embodiment, the first web conveyer of the fourteenth embodiment or the fifteenth embodiment may be disposed longitudinally between the first drying apparatus and the second drying apparatus.

In a seventeenth embodiment, the first drying apparatus of any of the fourteenth through sixteenth embodiments may comprise a hollow first dryer head and may be configured to direct air having an exit velocity of greater than 1000 m/min through the first dryer head toward the first web conveyer; and the air within the first dryer head may have a temperature of below 176 degrees C.

In an eighteenth embodiment, the air within the first dryer head of the seventeenth embodiment may have a temperature of above 80 degrees C.

In a nineteenth embodiment, the first drying apparatus of the seventeenth embodiment or the eighteenth embodiment may be configured to direct air having an exit velocity of greater than 2000 m/min through the first dryer head toward the first web conveyer In a twentieth embodiment, the second drying apparatus of any of the seventeenth through nineteenth embodiments may comprise a hollow second dryer head and may be configured to direct air having an exit velocity greater than the air exit velocity of the first dryer head, and the air within the second dryer head may have a temperature of below 176 degrees C.

Figure 1:
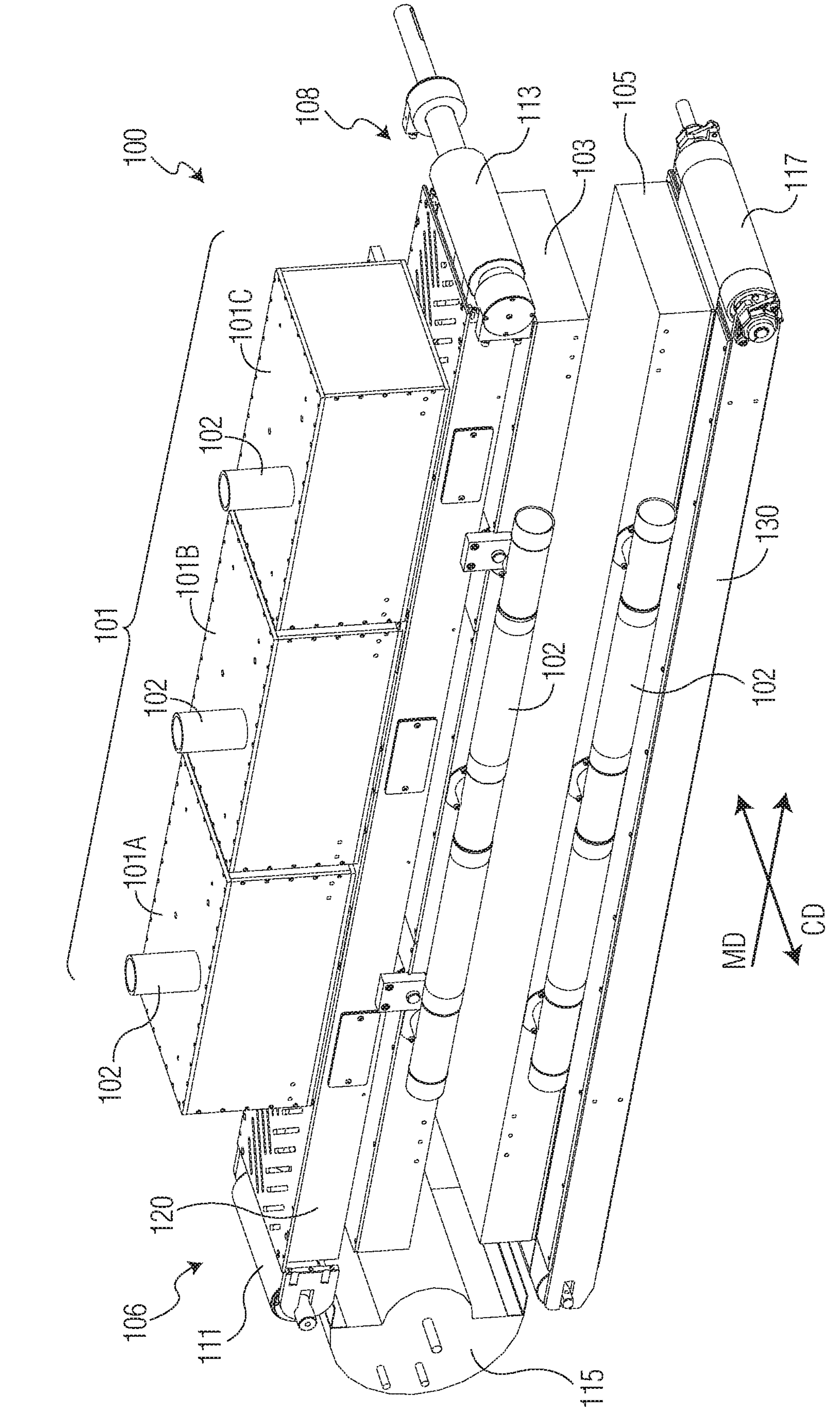
FIG. 1 is a perspective view of a dryer for web substrates, according to aspects of the present disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION OF THE DISCLOSURE

The present disclosure relates to absorbent articles and methods of manufacturing absorbent articles. More specifically, the present disclosure is directed toward absorbent articles with improved side seam bonds and methods for manufacturing such absorbent articles.

The following description should be read with reference to the drawings in which similar elements in different drawings are numbered the same. The description and the drawings, which are not necessarily to scale, depict illustrative embodiments and are not intended to limit the scope of the disclosure.

Within the context of this specification, each term or phrase below will include the following meaning or meanings. Additional terms are defined elsewhere in the specification.

"Connected" refers to the joining, adhering, bonding, attaching, or the like, of two elements. Two elements will be considered to be connected together when they are connected directly to one another or indirectly to one another, such as when each is directly connected to intermediate elements.

The term "film" refers herein to a thermoplastic film made using an extrusion and/or forming process, such as a cast film or blown film extrusion process. The term includes apertured films, slit films, and other porous films which constitute liquid transfer films, as well as films which do not transfer fluids, such as, but not limited to, barrier films, filled films, breathable films, and oriented films. Some example films can be constructed of a microporous polymeric film, such as polyethylene or polypropylene, or a non-woven material which has been coated or otherwise treated to impart a desired level of liquid impermeability.

"Disposed," "disposed on," and variations thereof are intended to mean that one element can be integral with another element, or that one element can be a separate structure bonded to or placed with or placed near another element.

"Machine direction" (MD) refers to the length of a fabric in the direction in which it is produced, as opposed to a "cross-machine direction" (CD) which refers to the width of a fabric in a direction generally perpendicular to the machine direction.

"Nonwoven fabric" or "nonwoven web", or simply "web" refers herein to a web having a structure of individual fibers or threads which are interlaid, but not in an identifiable manner as in a knitted fabric. Nonwoven fabrics or webs have been formed from many processes such as, for example, meltblowing processes, spunbonding processes, through-air bonded carded web (also known as BCW and TABCW) processes, etc.

These terms may be defined with additional language in the remaining portions of the specification.

Figure 2:
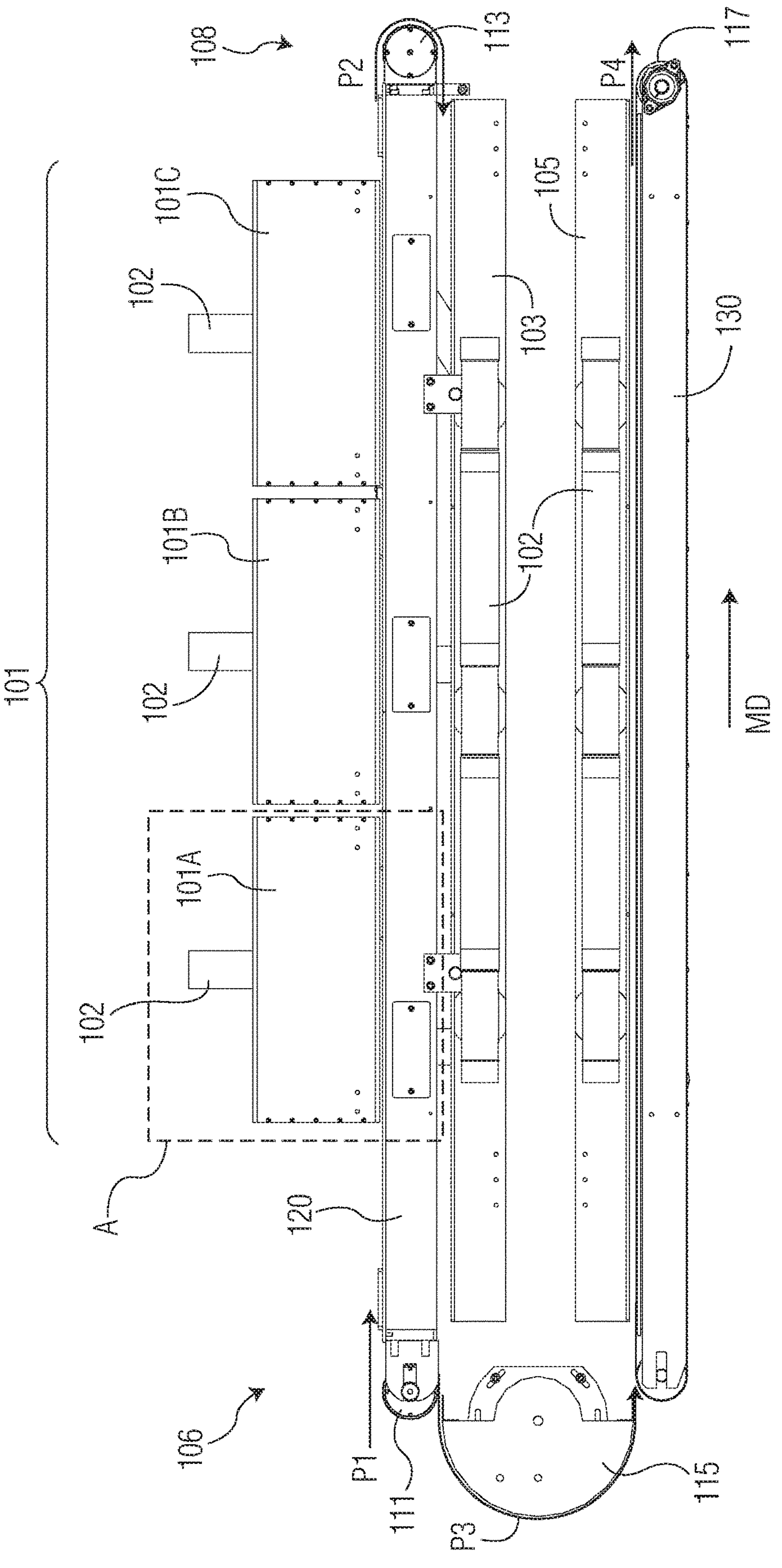
FIG. 2 is a front plan view of a dryer for web substrates, according to aspects of the present disclosure.

FIG. 1 is a perspective view of dryer apparatus 100 and FIG. 2 is a plan view of a front of the dryer apparatus 100. Together, FIGS. 1 and 2 depict many of the features of dryer 100. Dryer 100 may be a high-speed dryer for drying printed substrates utilizing high velocity, low temperature air. Such exemplary substrates may comprise polymeric films or nonwoven webs. In some embodiments, the web substrates may comprise materials commonly used in outer covers of absorbent articles. In general, dryer 100 may comprise web conveyer 120 and at least dryer heads 101 and 103. In some further embodiments, dryer 100 may also comprise web conveyer 130 and dryer head 105.

Web conveyer 120 may be configured to receive a printed web substrate (not shown) having a printed first surface and a second surface, with the printed first surface facing away from the web conveyer 120, at first end 106 at web guide roll 111. The printed first surface may generally face an upward direction, as in FIG. 1, but this is not necessary in all embodiments. In some embodiments, web guide roll may be a vacuum roll to help transition the printed web substrate onto the web conveyer 120 in a controlled manner. The web conveyer 120 may comprise a belt or screen (not shown) configured to travel around the web conveyer 120 in a continuous manner. The printed web substrate may traverse the web conveyer 120 on the belt or screen from the first end 106 to the second end 108, underneath dryer head 101. The dryer 100 may be capable of handling the printed web substrate at up to 600 meters per minute (m/min).

In some embodiments, the web conveyer 120 may be a vacuum conveyer where air is drawn into the web conveyer 120, providing suction at holes in the surfaces of the web conveyer 120. In such embodiments, the belt or screen may be a foraminous belt or screen comprising a plurality of holes or apertures which allow for air flow to provide the suction at the belt or screen surface. Where the belt or screen comprises a plurality of holes, the holes may be spaced from each other in the MD and the CD. Some exemplary values vacuum pressures at the holes or apertures may be between about 1 inch of water and about 10 inches of water, or between about 1 inch of water and about 7.5 inches of water, or between about 1 inch of water and 5 inches of water. In these embodiments, the CD spacing of the holes is preferably less than about 15 mm, or preferably less than about 13 mm, or preferably less than about 11 mm, or preferably less than about 9 mm, or preferably less than about 7 mm, or preferably less than about 5 mm. Due to the high velocity drying air employed by the dryer 100, it is important that suction be provided within the above distances from an edge of the printed substrate. Accordingly, employing a belt or screen having holes or apertures with the described CD spacing ensures that the CD edges of the printed substrate will be within about 15 mm, or about 13 mm, or about 11 mm, or about 9 mm, or about 7 mm, or about 5 mm of the CD edges of the substrate. Without this spacing, the high-speed air can get under and fold over the CD edges of the printed substrate as it travels along the web conveyer 120.

Between the first end 106 and the second end 108, the printed substrate may travel in a first direction which may generally be in the MD direction, as depicted by arrow P1 in FIG. 2. As used herein, the MD may refer to a horizontal direction in the direction main direction of travel of the printed substrate through a printing and/or manufacturing process, of which drying the printed substrate is one part. Accordingly, it is not necessary for the first direction to be exactly aligned with the MD. Rather, the first direction may have some MD component. For instance, the first direction may be angled longitudinally up or down and/or or skewed laterally from the MD and still be considered to be in the direction of the MD.

At the second end 108, the web conveyer 120 further comprises a second guide roll 113. The second guide roll 113 may be configured to receive the printed substrate and advance the printed substrate around the second guide roll 113, with the printed first surface of the web substrate facing away from the second guide roll 113, such that the printed substrate is disposed travelling in a second direction, following arrow P2. The second direction may be generally opposite the first direction in which the printed substrate travelled between the first end 106 and the second end 108 of the web conveyer 120. However, this second direction does not need to be exactly opposite the first direction. Rather, the second direction may have a component that is opposite the MD. That is, the second direction may be may be angled longitudinally up or down and/or or skewed laterally from a direction opposite the MD and still be considered to be in a direction opposite the MD.

In some embodiments where the web conveyer 120 is a vacuum conveyer, the web conveyer 120 may have suction on both a top and bottom surface of the web conveyer 120. In such embodiments, the printed substrate may transition from the second guide roll 113 to the web conveyer 120 and traverse the web conveyer 120 from the second end 108 back to the first end 106 on the underside of the web conveyer 120, with the printed first surface still facing away from the web conveyer 120. In other embodiments, a separate web conveyer from the web conveyer 120 may be disposed below the web conveyer 120, and the printed substrate may traverse the separate web conveyer in the second direction. Either way, the printed first surface of the web substrate may generally an opposite direction to the direction the printed first surface faced when the web substrate was traveling in the first direction. In the embodiment of FIG. 1, the printed first surface may generally face downward.

Proximate the first end 106 of the web conveyer 120, the dryer 100 further comprises third web guide roll 115. Third web guide roll 115 may be configured to receive the printed substrate and advance the printed substrate around the third web guide roll 115, with the printed first surface of the web substrate facing toward the third web guide roll 115, such that the printed substrate is disposed travelling in a third direction, following arrow P3. The third direction may be in the MD, and in some embodiments the third direction may be the same as the first direction.

The third web guide roll 115 may be a no-contact web guide roll. In such embodiments, the third web guide roll 115 may be hollow with a plurality of holes or apertures extending through an outer surface of the third web guide roll 115. Air may be forced through the holes or apertures at sufficient velocity to push the web substrate away from the third web guide roll 115 as the web substrate travels around the third web guide roll 115. In this manner, the printed first surface of the web substrate may not come into contact with the third web guide roll 115 and thus the printed ink on the printed first surface will not smear on the web substrate or transfer to the third web guide roll 115.

The printed web substrate may then transition from the third web guide roll 115 to another web conveyer 130. The web conveyer 130 may be similar to the web conveyer 120, and the printed substrate may traverse the web conveyer 130 in the third direction and may exit the web conveyer 130 at the fourth guide roll 117 in the direction of arrow P4. At this point, as will be further described below, ink on the web substrate will be dry enough for the web substrate to undergo further processing without smearing the ink and distorting the graphic/image or text which was printed onto the web substrate. For example, the web substrate may be laminated with one or more other materials or the web substrate may be rolled up for transfer to another manufacturing line.

For at least a portion of the path the web substrate travels along the web conveyers of the dryer 100, the web substrate passes through one or more web drying regions formed by the dryer heads 101, 103, and/or 105. The drying regions may generally be the regions disposed proximate the side of the dryer heads 101, 103, and/or 105 through which air is expelled. In general, the dryer heads 101, 103, and/or 105 may be hollow containers comprising one or more holes or apertures, sometimes in the form of slits as in the embodiments of FIGS. 1-5, through which air is expelled toward the web conveyers 120, 130. In some embodiments, the dryer heads 101, 103, and/or 105 may comprise single, unitary dryer heads with a single air supply supplying air to the entire dryer head. In other embodiments, the dryer heads 101, 103, and/or 105 may comprise multiple heads which may be defined by separate internal compartments within a unitary enclosure or separate sub-heads each having their own enclosure, such as sub-heads 101A, 101B, and 101C of dryer head 101. In these embodiments, each of the sub-heads may have their own air supply.

The dryer heads 101, 103, and/or 105 may have a dryer head CD width 144 that is co-extensive with the CD width of the web conveyers 120 and/or 130. In other embodiments, the dryer head CD width 144 may be between about 75% and about 125% of the CD width of the web conveyers 120 and/or 130. The dryer heads 101, 103, and/or 105 may further have a dryer head MD length 146. The dryer head MD length 146 may be between about 1.50 m and about 1.95 m. Where the dryer heads 101, 103, and/or 105 comprise a plurality of dryer sub-heads, each of the sub heads may have a sub-head MD length 142 that, together, add up to the dryer head MD length 146. Although, the exact length of the dryer heads 101, 103, and/or 105 could be different in other embodiments. The amount of drying required, and the operating parameters of the dryer may determine a necessary length 146 to effective a desired dryness of a printed web. The listed ranges may be suitable for drying materials and inks of the types listed in this disclosure.

Figure 3:
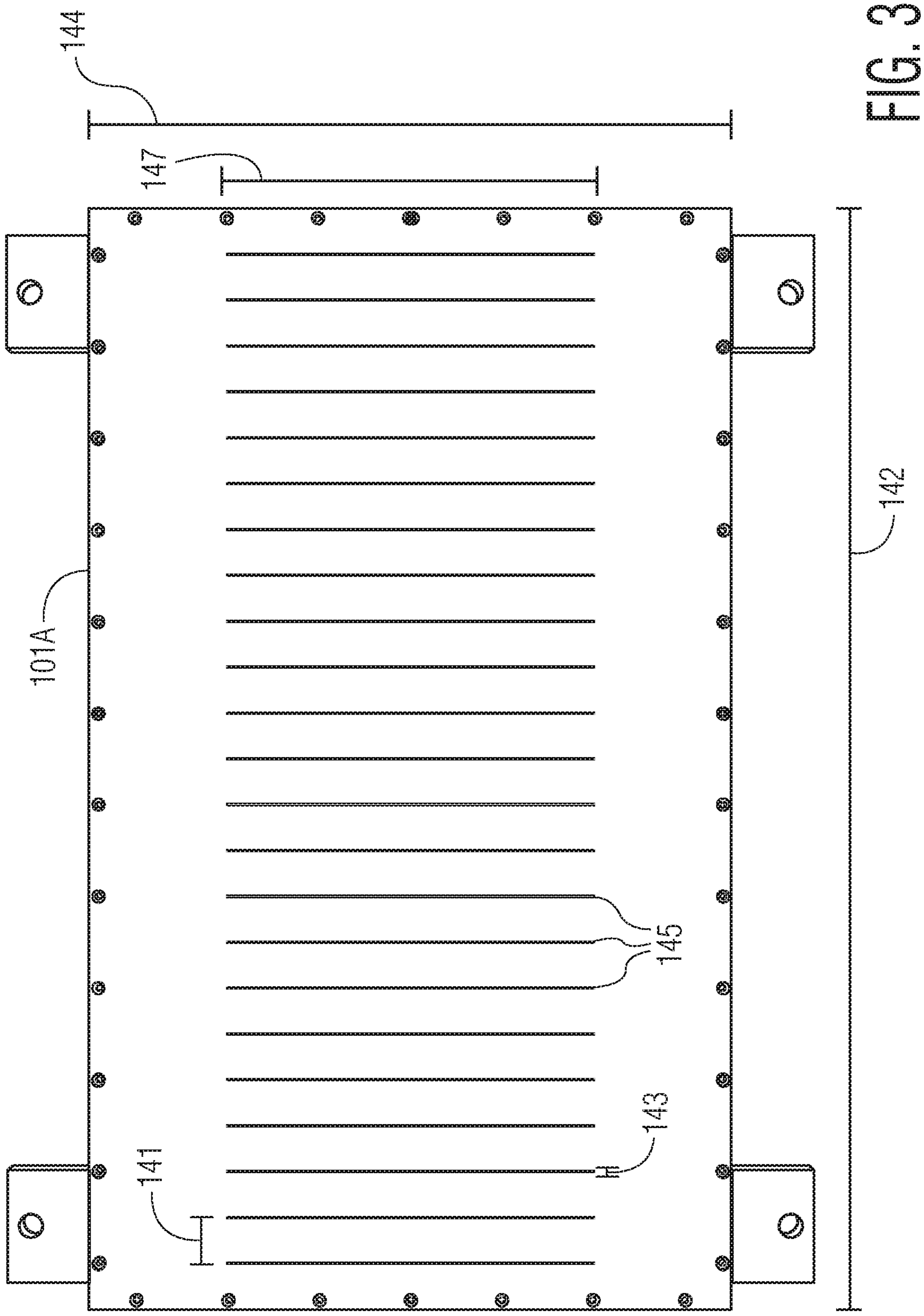
FIG. 3 is a bottom plan view of a dryer sub-head of the dryer of FIG. 1, according to aspects of the present disclosure.
Figure 4:
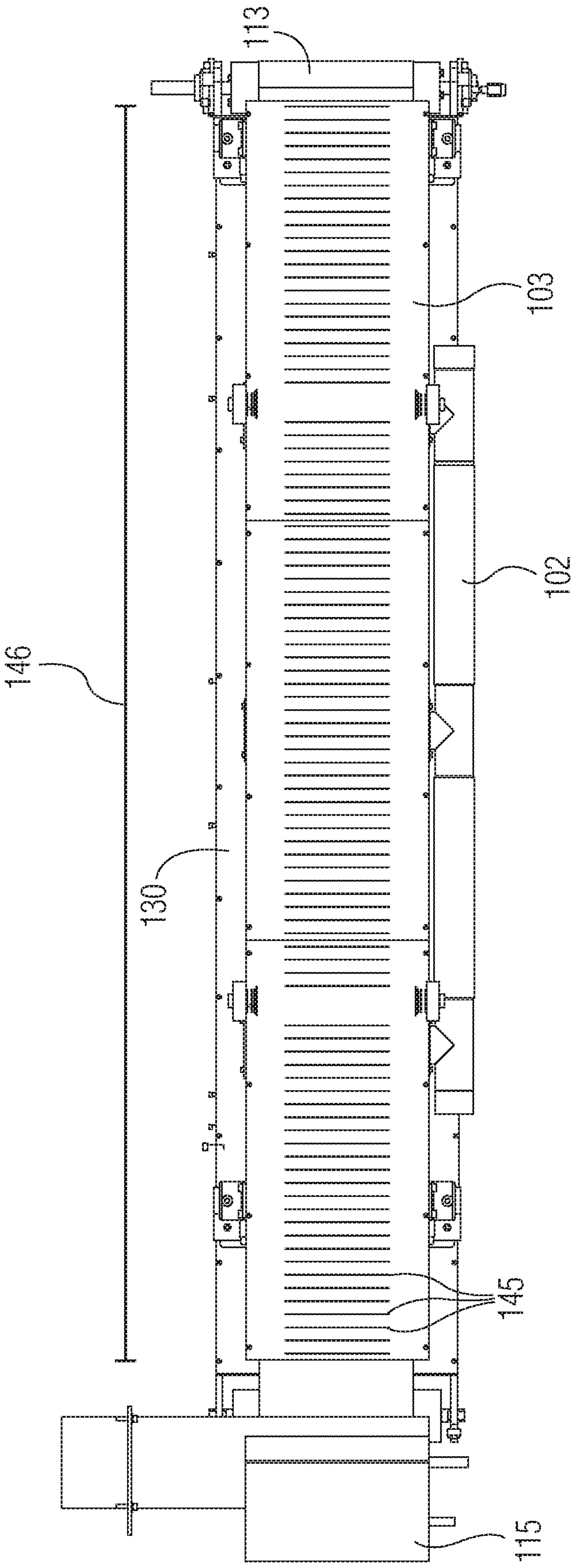
FIG. 4 is a top plan view of a dryer had of the dryer of FIG. 1, according to aspects of the present disclosure.
Figure 5:
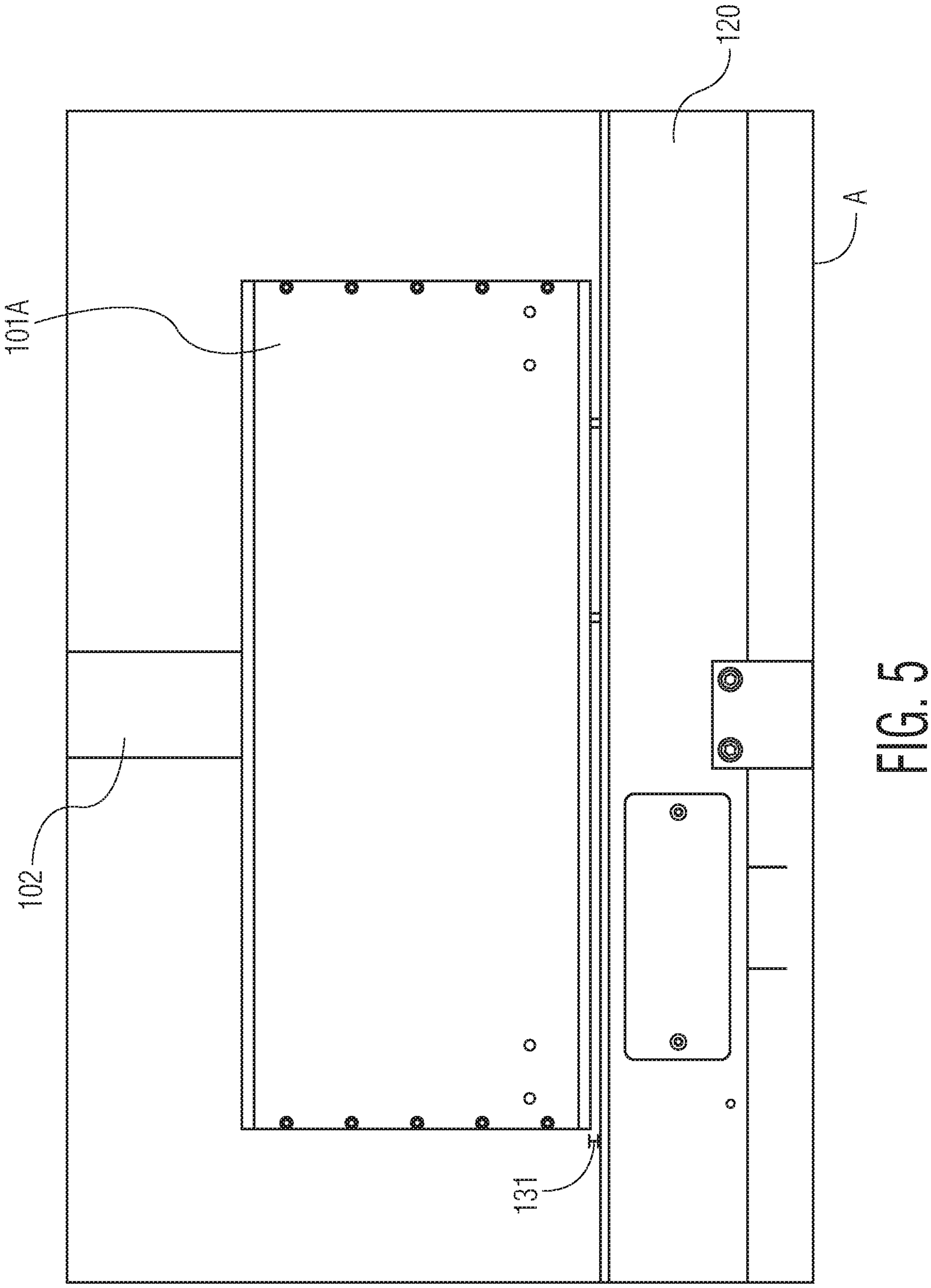
FIG. 5 is a close-up plan view of region A of FIG. 1, according to aspects of the present disclosure.

In some preferred embodiments, the holes or apertures of the dryer heads 101, 103, and/or 105 comprise slits 145, as in the embodiments of FIGS. 1-5. FIG. 3 is a bottom plan view of dryer sub-head 101A detailing features of the slits 145. For instance, the slits 145 may have slit widths 143 and slit spacing 141. The slit widths 143 may be the MD length of the slits 145, while the slit pacing 145 may be the spacing between adjacent slits 145 in the MD. In some embodiments, the slit widths 143 may be between about 0.50 mm and about 2 mm, or between about 0.65 mm and about 1.5 mm, or between about 0.7 mm and about 0.9 mm. The slit spacing 141 may be between about 10 mm to about 100 mm, or between about 15 mm and about 50 mm, or between about 20 mm and about 35 mm. The slits 45 may further have a slit CD width 147. The slit CD width 147 may be between about 65% and about 100% of the dryer head CD width 144, or between about 70% and about 90%, or between about 75% and about 85% of the dryer head CD width 144. These particular ranges are important for ensuring good airflow over the printed substrate which does not cause folding of the substrate.

The dryer heads 101, 103, and/or 105 may further be positioned at a head-conveyer spacing 131 with respect to the web conveyers 120 and/or 130. The head-conveyer spacing 131 may be between about 5 mm and about 25 mm, or between about 8 mm and about 20 mm, or between about 10 mm and about 15 mm. This head-conveyer spacing 131 provides for more efficient drying of the printed substrate due to the thermal conduction of the dryer heads 101, 103, and/or 105 themselves. For example, the enclosures of the dryer heads 101, 103, and/or 105 will absorb and radiate heat due to the hot air disposed within the dryer heads 101, 103, and/or 105 (which is described in more detail below). Accordingly, as the printed substrate passes under the dryer heads 101, 103, and/or 105, the dryer heads 101, 103, and/or 105 will radiate heat, helping to dry the ink on the printed substrate. If the dryer heads 101, 103, and/or 105 are too close to the web conveyers 120 and/or 130, typical printed substrates may melt due to their low melting temperatures. Conversely, if the dryer heads 101, 103, and/or 105 are too far away from the web conveyers 120 and/or 130, the drying effect on the ink of the printed substrate of the radiated heat from the dryer heads 101, 103, and/or 105 becomes diminished.

The dryer heads 101, 103, and/or 105 are connected to one or more air supplies (not shown) via air handling pipes 102. In some embodiments, one air supply mechanism may supply air to all of the dryer heads 101, 103, and/or 105. In other embodiments, each of the dryer heads 101, 103, and/or 105 may have their own air supply mechanism. In still further embodiments, each sub-head of the dryer heads 101, 103, and/or 105 may have their own air supply mechanism. Such air supply mechanisms may comprise fans, or pumps, or compressors or the like which are capable of supplying air to the dryer heads 101, 103, and/or 105. Situated between the air supply mechanism(s) and the dryer heads 101, 103, and/or 105 is one or more heating elements to heat the supplied air to a desired temperature.

In this manner, heated air may be supplied to the dryer heads 101, 103, and/or 105. Where multiple air supply mechanisms supply air to the dryer 100, the particular parameters of the air supplied to the different dryer heads 101, 103, and/or 105 may be customized. For instance, the air supplied to the dryer head 101 may be different, in terms of temperature or volume, than the air supplied to the other dryer heads 103 and/or 105. In still other embodiments, the air supplied to the any sub-heads of the dryer heads 101, 103, and/or 105 may be different, in terms of temperature or volume, than at least one other sub-head of the same dryer head 101, 103, or 105. Differences in volume of air supplied to the dryer heads 101, 103, and/or 105 may translate to different velocities of the air exiting the dryer heads 101, 103, and/or 105.

The air supply mechanisms, the dryer heads 101, 103, and/or 105 including the slit dimensions, and the heating elements may be configured such that the air leaving the slits 145 of the dryer heads 101, 103, and/or 105 may exit at a high-velocity of between about 1000 meters per minute (m/min) and about 7000 m/min, or between about 1500 m/min and about 5500 m/min, or between about 2000 m/min and about 4000 m/min. Additionally, the temperature of the air, as measured within the dryer heads 101, 103, and/or 105 may be relatively low, such as between about 70 degrees C. and about 180 degrees C., or between about 80 degrees C. and about 150 degrees C., or between about 82 degrees C. and about 105 degrees C.

As mentioned above, the particular air velocities and temperatures may vary between the dryer heads 101, 103, and/or 105 in some embodiments. For example, the velocity of the air exiting the dryer head 101 may be relatively lower than the velocity of the air exiting the dryer head 103 and/or 105. As the printed web substrate enters the dryer 100, the printed web substrate first encounters the dryer head 101. At this point, the ink on the printed web substrate may still be relatively damp. Accordingly, the dryer head 101 may use relatively lower-velocity air than the dryer heads 103 and/or 105 as use of relatively higher-velocity air at the dryer head 101 may cause the ink on the printed web substrate to smear. In at least some of these embodiments, the temperature of the air within the dryer head 101 may be relatively higher than the temperature of the air in the dryer heads 103 and/or 105 in order to compensate for the relatively lower-velocity air used at the dryer head 101.

In further embodiments, the velocity and/or temperature of the air may be different between dryer sub-heads of the same dryer head 101, 103, and/or 105, either instead of or in conjunction with varying the velocity and/or temperature air between the different dryer heads 101, 103, and/or 105. For example, where the dryer head 101 comprises three sub-heads 101A, 101B, and 101C, the velocity of the air exiting the sub-head 101A may be less than the velocity of the air exiting the sub-head 101B or 101C. In at least some of these embodiments, the temperature of the air within the sub-head 101A may be greater than the temperature of the air within the sub-head 101B or 101C. In some further embodiments, the velocity of the air exiting the sub-head 101B may be less than the velocity of the air exiting the sub-head 101C and/or the temperature of the air within the sub-head 101B may be greater than the temperature of the air within the sub-head 101C.

In some embodiments, where each of the dryer heads 101, 103, and/or 105 comprises a plurality of sub-heads, the velocity of the air exiting a first of the sub-heads within a given dryer head 101, 103, or 105 along the web substrate path may be less than at least one of the sub-heads of the given dryer head 101, 103, or 105 farther along the web substrate path. In further embodiments, this trend may also be true between the dryer heads 101, 103, and/or 105. For example, the velocity of the air exiting the dryer sub-head 101C may be less than the velocity of the air exiting the first dryer sub-head of the dryer head 103 along the web substrate path. In still further embodiments, the velocity of the air exiting the last dryer sub-head of the dryer head 103 along the web substrate path may be less than the velocity of the air exiting the first dryer sub-head of the dryer head 105 along the web substrate path. In this manner, the velocity of the air exiting the slits of the dryer heads 101, 103, and/or 105 may continually become greater along the web substrate path within the dryer 100.

In further embodiments, however, the velocity of the air exiting the dryer heads 101, 103, and/or 105 may not continually increase along the web substrate path. Instead, the velocity of the air exiting the dryer heads 101, 103, and/or 105 may increase to a point and then remain constant. As one example, the velocity of the air exiting the sub-head 101A may be less than the velocity of the air exiting the sub-head 101B or 101C. However, the velocity of the air exiting the dryer sub-head 101C may be the same as the velocity of the air exiting the dryer head 103, which may be the same, or substantially the same, as the velocity of the air exiting the dryer head 105. Alternatively, the velocity of the exiting air may continue to increase throughout the dryer head 103, and the velocity of the air exiting the last sub-head of the dryer head 103 along the web substrate path may be the same, or substantially the same, as the velocity of the air exiting the dryer head 105.

In some additional or alternative embodiments to those above describing the varying velocities of the air, the temperature of the air within the dryer heads 101, 103, and/or 105 and/or the sub-heads of the dryer heads 101, 103, and/or 105 may vary in a similar manner to that described above with respect to the velocities of the air, although the trend may be in the opposite direction. For example, the temperature of the air within a first of the sub-heads within a given dryer head 101, 103, or 105 along the web substrate path may be greater than at least one of the sub-heads of the given dryer head 101, 103, or 105 farther along the web substrate path. In further embodiments, this trend may also be true between the dryer heads 101, 103, and/or 105. For example, the temperature of the air within the dryer sub-head 101C may be greater than the temperature of the air of the first dryer sub-head of the dryer head 103 along the web substrate path. In still further embodiments, the temperature of the air within the last dryer sub-head of the dryer head 103 along the web substrate path may be greater than the temperature of the air within the first dryer sub-head of the dryer head 105 along the web substrate path. In this manner, the temperature of the air within the dryer heads 101, 103, and/or 105 may continually decrease along the web substrate path within the dryer 100.

In further embodiments, however, the temperature of the air within the dryer heads 101, 103, and/or 105 may not continually decrease along the web substrate path. Instead, the temperature of the air within the dryer heads 101, 103, and/or 105 may decrease to a point and then remain constant. As one example, the temperature of the air within the sub-head 101A may be greater than the temperature of the air within the sub-head 101B or 101C. However, the temperature of the air within the dryer sub-head 101C may be the same as the temperature of the air within the dryer head 103, which may be the same, or substantially the same, as the temperature of the air within the dryer head 105. Alternatively, the temperature of the air may continue to decrease throughout the dryer head 103, and the temperature of the air within the last sub-head of the dryer head 103 along the web substrate path may be the same, or substantially the same, as the temperature of the air within the dryer head 105.

In the embodiment of FIGS. 1-5, the dryer 100 is shown in a stacked configuration where the web substrate winds through multiple direction changes. It should be understood that this is only one possible configuration of the dryer 100. In other embodiments, where space is not a concern, the dryer 100 may have no stacked portions. Instead, the dryer 100 may comprise one long run comprising the dryer heads 101, 103, and/or 105 extending in the MD in a line. In some of these embodiments, the dryer 100 may only comprise one long dryer head, with many multiple dryer sub-heads. Accordingly, the drying process described above can be implemented in any particular fashion. The embodiments of FIGS. 1-5 only depict exemplary embodiments which may be preferred in a space-saving configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of drying a web substrate comprising:

advancing a web substrate in a first web travel direction toward a first dryer head and a first surface of a vacuum web conveyor, the web substrate having a first web surface including ink and a second web surface, the first web surface disposed opposite the first surface of the vacuum web conveyor;

supplying air to the first dryer head, the air within the first dryer head having a temperature of less than 176 degrees C.;

directing air from the first dryer head toward the first surface of the web conveyer at a velocity greater than 1000 m/min and forming a first drying region; and advancing the web substrate in the first web travel direction on the first surface of the vacuum web conveyer and through the first drying region;

advancing the web substrate around a rotating web guide roll such that the web substrate is disposed on a second surface of the vacuum web conveyor and conveyed in a second web travel direction that is generally opposite to the first web travel direction.

2. The method of claim 1, wherein the air within the first dryer head has a temperature of at least 70 degrees C.

3. The method of claim 1, wherein the air within the first dryer head has a temperature of at least 80 degrees C.

4. The method of claim 1, wherein the air within the first dryer head has a temperature of less than 125 degrees C.

5. The method of claim 1, further comprising directing air from the first dryer head toward the web conveyer at a velocity greater than 2000 m/min.

6. The method of claim 1, further comprising directing air from the first dryer head toward the web conveyer at a velocity between about 2000 m/min and about 4000 m/min.

7. The method of claim 1, wherein the first dryer head is disposed a distance from the web conveyer between about 8 mm and about 20 mm.

8. The method of claim 1, wherein the first dryer head is disposed a distance from the web conveyer between about 10 mm and about 15 mm.

9. The method of claim 1, wherein the air is directed from the first dryer head through slits in the dryer head, the slits having a width in the MD of between about 0.5 mm and about 2.0 mm.

10. The method of claim 1, further comprising:

supplying air to a second dryer head located proximate the web conveyer and downstream from the first dryer head along a web path of the web substrate, the air within the second dryer head having a temperature that is less than temperature of the air within the first dryer head.

11. The method of claim 1, further comprising:

supplying air to a second dryer head located proximate the web conveyer and downstream from the first dryer head along a web path of the web substrate, the air within the second dryer head having a temperature that is less than 176 degrees C.; and directing air from the second dryer head toward the web conveyer at a velocity greater than the air directed at the web conveyer from the first dryer head.

12. The method of claim 11, wherein the second dyer head is disposed longitudinally underneath the first dryer head, and wherein the first web conveyer is disposed between the first dryer head and the second dryer head.

13. The method of claim 12, further comprising:

supplying air to a third dryer head located downstream from the first dryer head and the second dryer head along a web path of the web substrate, the air within the third dryer head having a temperature that is less than 176 degrees C.; and directing air from the third dryer head toward the web substrate at a velocity greater than the air directed at the web conveyer from the first dryer head, wherein the third dyer head is disposed longitudinally underneath the second dryer head.

14. The method of claim 1, further comprising:

directing air from a second dryer head toward the second surface of the vacuum web conveyor to form a second drying zone; and advancing the web substrate through the second drying zone such that the air directed from the second dryer head is directed toward first web surface.

15. The method of claim 1, wherein the second surface of the vacuum web conveyor is opposite the first surface of the vacuum web conveyor.

16. The method of claim 1, wherein the vacuum web conveyor has suction on both the first surface and the second surface of the vacuum web conveyor.

17. The method of claim 1, further comprising advancing the web substrate around a non-contact web guide roll with the first web surface facing the non-contact web guide roll to convey the web substrate in a third web travel direction.

* * * * *